United States Patent
Gwon

(10) Patent No.: US 8,157,314 B2
(45) Date of Patent: Apr. 17, 2012

(54) OVERHEAD CONSOLE FOR VEHICLE

(75) Inventor: Sung-jin Gwon, Gimpo-si (KR)

(73) Assignee: GM Daewoo Auto & Technology Company (KR)

( * ) Notice: Subject to any disclaimer, the term of this patent is extended or adjusted under 35 U.S.C. 154(b) by 170 days.

(21) Appl. No.: 12/674,805

(22) PCT Filed: Aug. 14, 2008

(86) PCT No.: PCT/KR2008/004750
§ 371 (c)(1),
(2), (4) Date: Feb. 23, 2010

(87) PCT Pub. No.: WO2009/028820
PCT Pub. Date: May 5, 2009

(65) Prior Publication Data
US 2011/0127793 A1 Jun. 2, 2011

(30) Foreign Application Priority Data
Aug. 24, 2007 (KR) .................. 10-2007-0085741

(51) Int. Cl.
*B60R 7/04* (2006.01)
(52) U.S. Cl. ....... 296/37.7; 296/1.11; 359/841; 359/844
(58) Field of Classification Search ............. 296/24.34, 296/37.87, 37.7, 1.11; 359/841, 844, 868, 359/872
See application file for complete search history.

(56) References Cited

U.S. PATENT DOCUMENTS

| 5,719,714 | A * | 2/1998 | Ackeret ..................... 359/871 |
| 5,775,761 | A * | 7/1998 | Asami et al. ................ 296/37.7 |
| 7,055,883 | B2 * | 6/2006 | Tokutomi et al. ............ 296/37.8 |
| 7,686,464 | B2 * | 3/2010 | Compton et al. ............ 359/866 |
| 2008/0067827 | A1 * | 3/2008 | Tiesler et al. ............... 296/37.7 |
| 2008/0122239 | A1 * | 5/2008 | May et al. .................. 296/24.34 |
| 2008/0252090 | A1 * | 10/2008 | Tiesler et al. ............... 296/37.7 |
| 2010/0301625 | A1 * | 12/2010 | Lee ............................ 296/37.8 |

FOREIGN PATENT DOCUMENTS

| FR | 00754144 A | * 10/2008 |
| JP | 2006142892 A | * 6/2006 |
| KR | 10-2004-0031437 | 4/2004 |
| KR | 10-2005-0114492 | 12/2005 |
| KR | 10-2006-0062046 | 6/2006 |

OTHER PUBLICATIONS

International Search Report. Jan. 30, 2009.

* cited by examiner

*Primary Examiner* — Jason S Morrow
(74) *Attorney, Agent, or Firm* — Ballard Spahr LLP

(57) ABSTRACT

Provided is an overhead console for a vehicle including a housing installed in the front of an indoor ceiling of the vehicle, having an opening opened downward, and including a rotary shaft installed in the opening, a mirror case rotatably coupled to the rotary shaft of the housing and having an insertion part formed therein, a conversation mirror attached to the mirror case and including a mirror that enters and exits in a direction of a driver, and a spectacles-case inserted into the insertion part of the mirror case and rotatably coupled to the rotary shaft of the housing, to which the mirror case is coupled.

3 Claims, 4 Drawing Sheets

[Fig. 1]
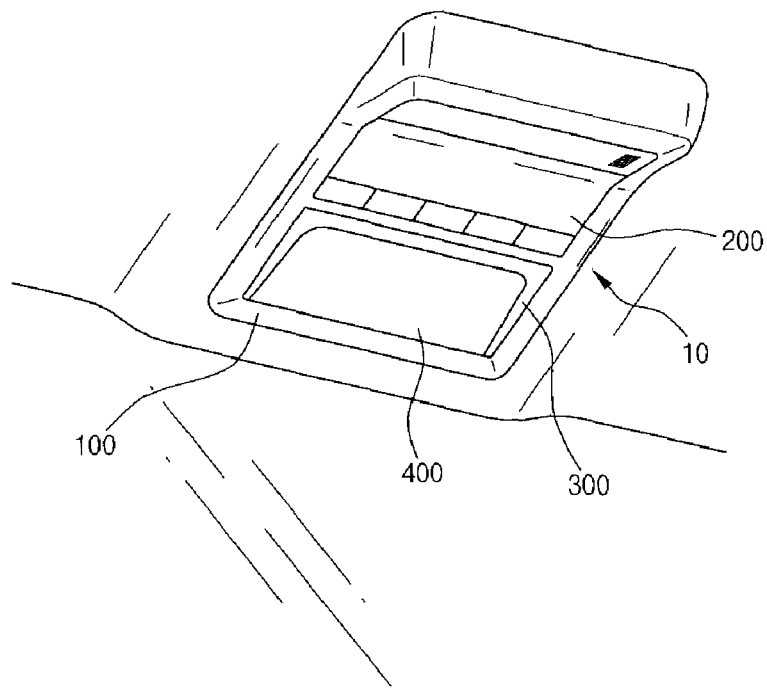
[Fig. 2]
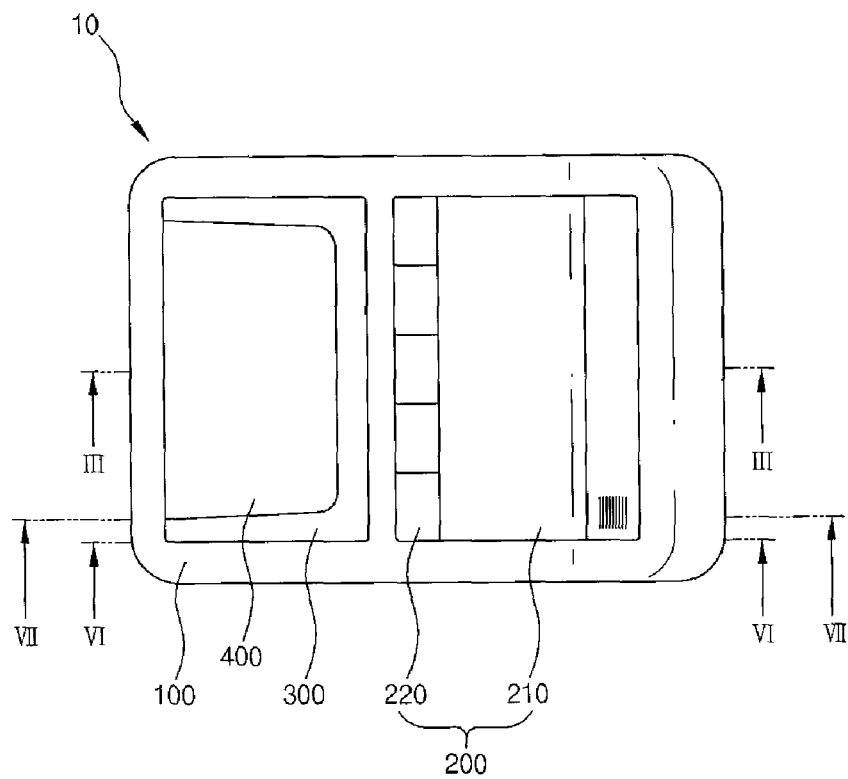

[Fig. 3]
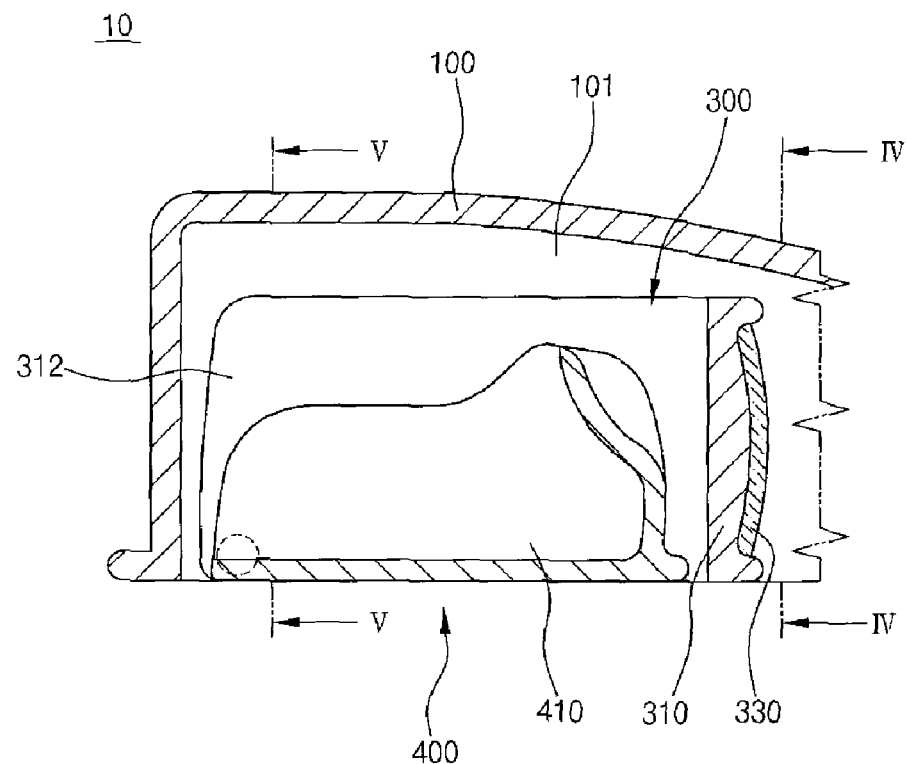
[Fig. 4]
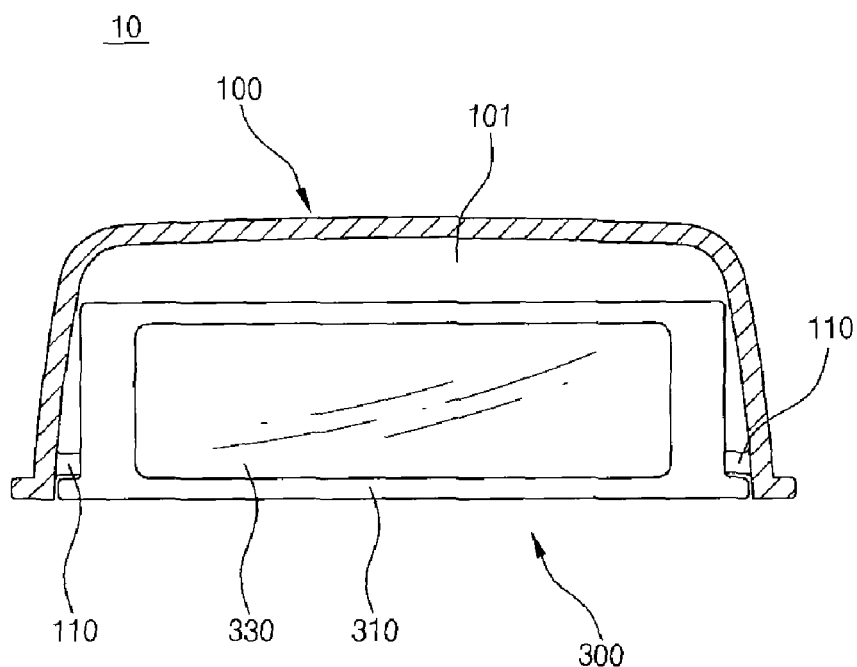

[Fig. 5]
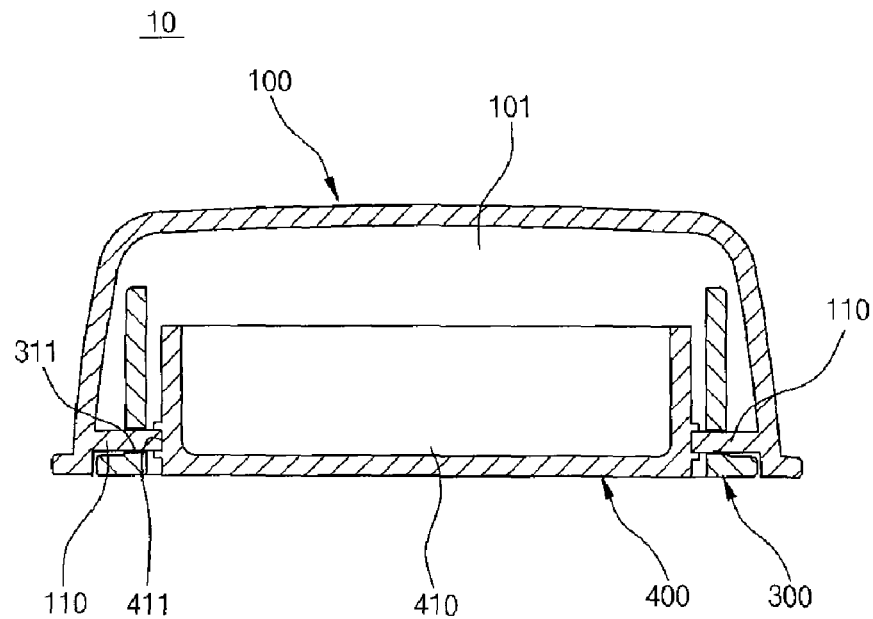
[Fig. 6]
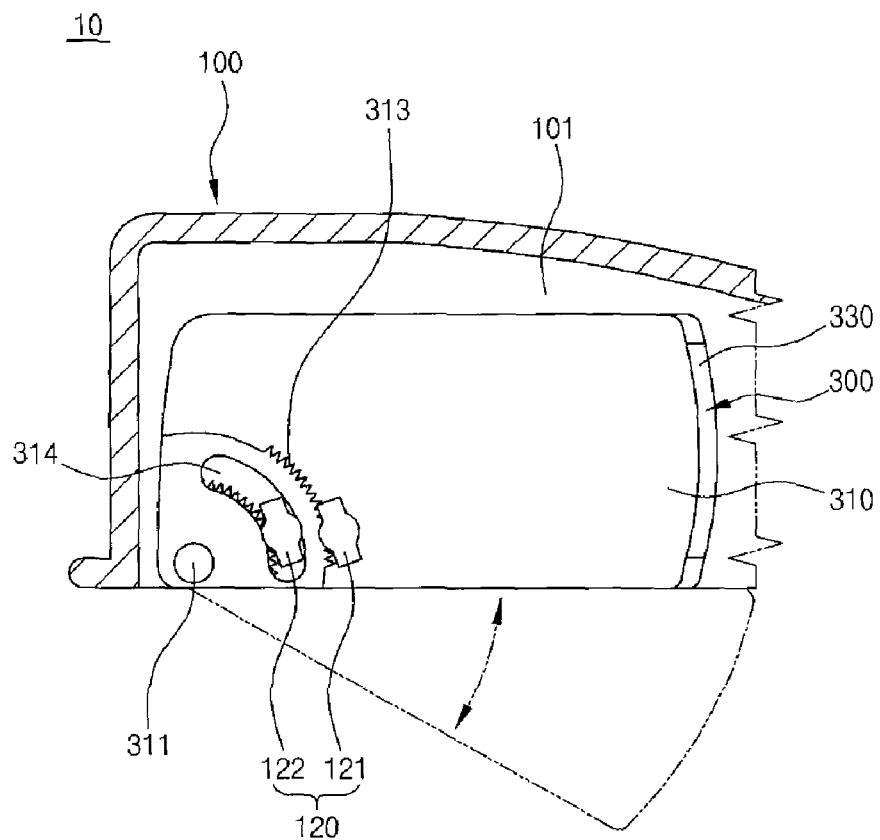

[Fig. 7]
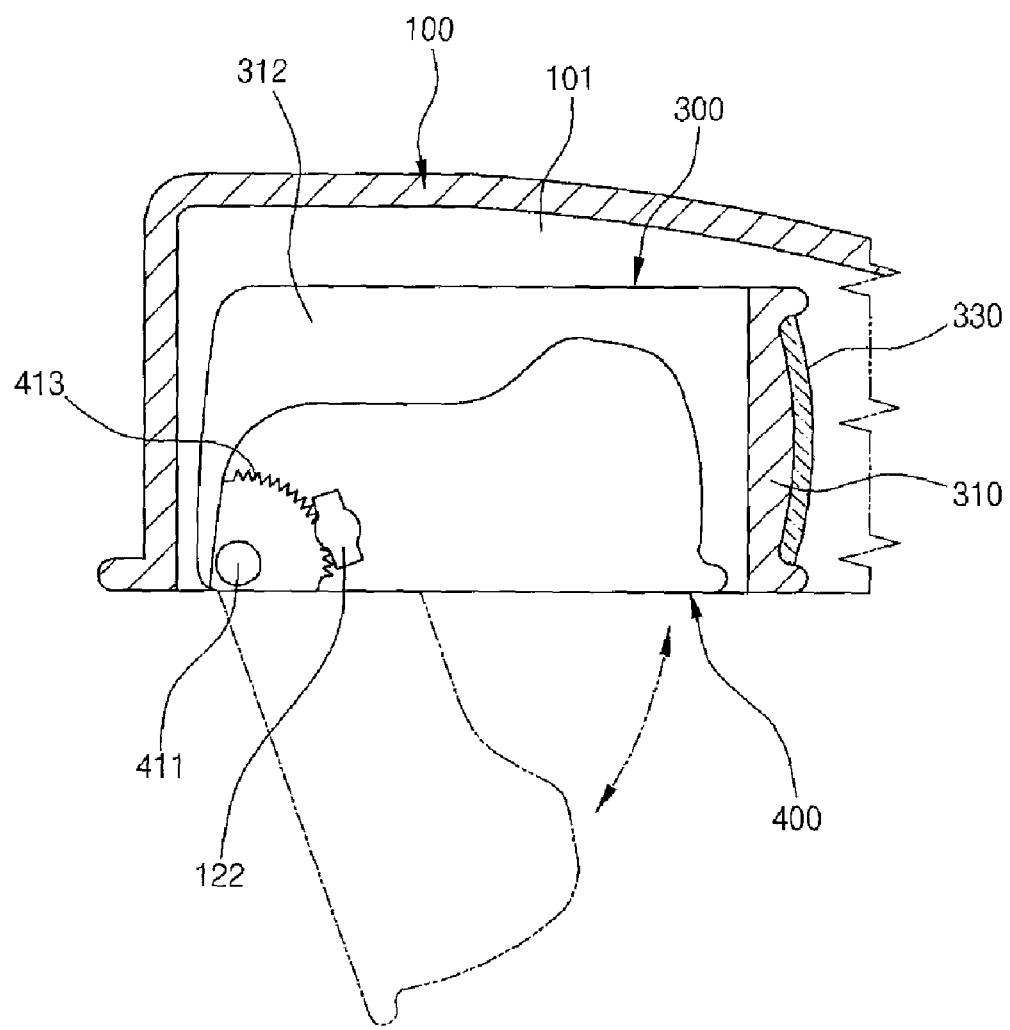

US 8,157,314 B2

OVERHEAD CONSOLE FOR VEHICLE

CROSS REFERENCE TO RELATED APPLICATIONS

The present application is a National Phase Application of International Application No. PCT/KR2008/004750, filed Aug. 14, 2008, which claims priority to Korean Patent Application No. 10-2007-0085741 filed Aug. 24, 2007, which applications are incorporated herein fully by this reference.

TECHNICAL FIELD

The present invention relates to an overhead console installed at a vehicle, and more particularly, to an overhead console for a vehicle capable of mounting a spectacles-case in a conversation mirror mounted on the overhead console to reduce the size of the overhead console.

BACKGROUND ART

Since a recreation vehicle (RV) such as a sports utility van, a wagon, or the like, can take relatively many passengers in a relatively wide indoor space, the recreation vehicle includes a conversation mirror for observing the indoor space as optional part.

The conversation mirror is installed in front of a driver's seat, which can be readily observed by a driver, to observe rear seats at any time while the driver is driving.

The conversation mirror is useful when only children are in the rear seats without adult supervision. That is, since the driver can observe the children's behavior in the rear seats at any time through the conversation mirror, it is possible to prevent occurrence of safety accidents to the children.

In general, the conversation minor is installed to be accommodated in an overhead console installed in the front of an indoor ceiling to increase space utilization of the vehicle. However, when the conversation mirror is installed at the overhead console, a spectacles-case and an indoor lamp are also installed at the overhead console in addition to the conversation minor, thus increasing the volume of the overhead console and decreasing space utilization of the vehicle.

That is, when the conversation minor is further included in the overhead console, the size of the overhead console should be increased in comparison with the conventional overhead console including the spectacles-case and the indoor lamp only.

As described above, when the conversation mirror is included, increasing the size of the overhead console, it is difficult to install a sunroof at a ceiling of the vehicle. In addition, when the sunroof is installed at the ceiling, the overhead console having no conversation minor should be used. Although the overhead console including the conversation minor can be installed together with the sunroof, since an installation position the sunroof must be moved rearward in comparison with a conventional installation position, it is difficult to correctly install the sunroof.

DISCLOSURE OF INVENTION

Technical Problem

In order to solve the foregoing and/or other problems, it is an object of the present invention to provide an overhead console for a vehicle capable of supplying the same size of overhead console as the conventional overhead console, regardless of the kind of vehicle, even when the overhead console includes a spectacles-case, an indoor lamp, and a conversation mirror.

Technical Solution

One aspect of the present invention provides an overhead console for a vehicle including: a housing installed in the front of an indoor ceiling of the vehicle and having an opening opened downward, and a conversation minor and a spectacles-case rotatably coupled in the housing to enter and exit through the opening, wherein the conversation minor and the spectacles-case are rotated about the same rotary shaft installed in the housing, and the spectacles-case is accommodated in the conversation mirror when the conversation mirror and the spectacles-case are accommodated in the housing.

In addition, the conversation mirror may include a mirror case rotatably coupled to the rotary shaft and having an insertion part formed therein, and a mirror attached to an outer surface of the mirror case, and the spectacles-case may be rotatably coupled to the rotary shaft and inserted into the insertion part of the minor case.

Further, the spectacles-case may be opened downward more than the conversation mirror.

Furthermore, the minor attached to the mirror case may be a convex mirror.

BRIEF DESCRIPTION OF THE DRAWINGS

The above and other objects, features and advantages of the present invention will be more apparent from the following detailed description taken in conjunction with the accompanying drawings, in which:

FIG. 1 is a perspective view of an overhead console in accordance with an exemplary embodiment of the present invention;

FIG. 2 is a plan view of the overhead console of FIG. 1;

FIG. 3 is a cross-sectional view taken along line III-III' of FIG. 2;

FIG. 4 is a cross-sectional view taken along line IV-IV' of FIG. 3;

FIG. 5 is a cross-sectional view taken along line V-V' of FIG. 3;

FIG. 6 is a cross-sectional view taken along line VI-VI of FIG. 2; and

FIG. 7 is a cross-sectional view taken along line VII-VII' of FIG. 2.

MODE FOR THE INVENTION

Exemplary embodiments of the present invention will now be described in detail with reference to the accompanying drawings.

Referring to FIGS. 1 and 2, an overhead console 10 in accordance with an exemplary embodiment of the present invention is installed in the front of an indoor ceiling of a vehicle. A conversation mirror 300 is accommodated in the front of the overhead console 300 to enter thereinto and exit therefrom, and a spectacles-case 400 is accommodated in the conversation mirror 300 to enter thereinto and exit therefrom. In addition, an indoor lamp 200 including a lamp 210 and a switch 220 for operating the lamp 210 is installed in the rear of the overhead console 10.

Referring to FIGS. 3 to 5, the housing 100 constituting the overhead console 10 has an opening 101 opened downward, and rotary shafts 110 are attached to front lower parts of an inner wall of the opening 101 to project inside. Here, the rotary shafts 110 are detachably attached to the housing 100 such that components inserted into the housing can be easily coupled thereto.

A conversation minor 300 is installed to the opening 101 of the housing 100 to be rotated about the rotary shafts 110. The conversation minor 300 includes a minor case 310 coupled to the rotary shafts 110, and a mirror 330 attached to the mirror case 310. First, an insertion part 312 is formed in the mirror case 310, and fastening grooves 311, into which the rotary shafts 110 are inserted, are formed at both sidewalls of the case 310. The mirror 330 is attached to the mirror case 310 to be accommodated in the housing 100, and rotated about the rotary shaft 110 of the housing 100 to enter and exit through the opening 101 of the housing. Here, the minor 330 may be a convex mirror capable of effectively observing rear seats.

The spectacles-case 400 is inserted into the mirror case 300 coupled to the housing 100 to be rotated about the rotary shafts 110, to which the minor case 310 is coupled. The spectacles-case 400 has an accommodating part 410 for accommodating spectacles therein.

Referring to FIGS. 3, 6 and 7, the conversation mirror 300 and the minor case 400 included in the overhead console 10 independently enter and exit through the opening 101 of the housing 100 of the overhead console 10.

First, reviewing operation of the conversation mirror 300, when a driver extracts the conversation minor 300 through the opening 101 of the housing 100, the minor case 310 is discharged downward from the housing 100, and the mirror 330 attached to the mirror case 310 is directed to a viewing angle of the driver. When the conversation mirror 300 is not used, the conversation mirror 300 is manually pushed to be inserted into the housing 100 and fixed to a fixing device (not shown) formed at the housing 100.

The spectacles-case 400 is configured to store sunglasses or spectacles to be used by the driver during driving, and is opened only when the stored sunglasses or spectacles are inserted or removed. When the spectacles-case 400 is opened, the spectacles-case 400 is opened downward from the inside of the insertion part 312 of the mirror case 310 fixed to the housing 100. After opening of the spectacles-case 400, the spectacles-case is pushed into the insertion part 312 of the mirror case 310 to be fixed to the fixing device (not shown) formed at the housing 100.

The fixing device (not shown) formed at the housing 100 to fix the conversation mirror 300 and the spectacles-case 400 is configured such that the conversation minor 300 and the spectacles-case 400 are independently operated. This is to ensure that only the case needed for use purposes is opened.

Arcuate teeth 313 and 413 disposed about fastening grooves 311 and 411 coupled to the rotary shafts 110 are formed at sidewalls of the mirror case 310 and the spectacles-case 400, respectively. A first damper 121 and a second damper 122 having gears corresponding to the teeth 313 and 413 may be installed at sidewalls of the housing 100. The reason for this is that, when the conversation minor 300 and the spectacles-case 400 are opened from the housing 100, it is possible to prevent them from rapidly dropping and generating a collision sound, and to prevent the spectacles-case 400 from being shaken and the sunglasses or spectacles accommodated therein from falling to the exterior.

For this purpose, in order to use a damper 120 for the conversation mirror 300 and the spectacles-case 400, a slot 314 should be formed at the sidewall of the mirror case 310 along the teeth 413 of the spectacles-case 400, and a second damper 122 installed at the housing 100 passes through the slot 314 to be meshed with the teeth 413 of the spectacles-case 400.

While few exemplary embodiments of the present invention have been shown and described, it will be appreciated by those skilled in the art that various changes may be made to these embodiments without departing from the spirit and scope of the invention as defined by the appended claims and their equivalents.

INDUSTRIAL APPLICABILITY

As can be seen from the foregoing, in an overhead console for a vehicle in accordance with the present invention, since a spectacles-case is inserted into a mirror case of a conversation minor installed in the overhead console, and the minor case and the spectacles-case are installed at the same rotary shaft installed in the housing, it is possible to make the overhead console having the same size as a conventional overhead console having no conversation mirror and simplify the structure thereof to readily assembly the overhead console.

In addition, since the conversation minor uses a convex mirror, it is possible for a driver to observe rear seats without a dead zone.

The invention claimed is:

1. An overhead console for a vehicle comprising: a housing installed in the front of an indoor ceiling of the vehicle and having an opening opened downward; and a conversation mirror and a spectacles-case rotatably coupled in the housing to enter and exit through the opening, wherein the conversation mirror and the spectacles-case are rotated about the same rotary shaft installed in the housing, and the spectacles-case is accommodated in the conversation mirror when the conversation mirror and the spectacles-case are accommodated in the housing wherein the conversation mirror comprises:
a mirror case (310) rotatably coupled to the rotary shaft and having an insertion part formed therein; and
a mirror attached to an outer surface of the mirror case, and
the spectacles-case is rotatably coupled to the rotary shaft and inserted into the insertion part of the mirror case.

2. The overhead console for a vehicle according to claim 1, wherein the spectacles-case is opened downward more than the conversation mirror.

3. The overhead console for a vehicle according to claim 1, wherein the mirror is a convex mirror.

* * * * *